（12) United States Patent
Zhiwen et al.

(10) Patent No.: US 11,100,954 B2
(45) Date of Patent: *Aug. 24, 2021

(54) SYSTEMS AND METHODS FOR EFFICIENT MEDIA EDITING

(71) Applicant: Lomotif Private Limited, Singapore (SG)

(72) Inventors: Paul Yang Zhiwen, Singapore (SG); Donald Lee, Singapore (SG)

(73) Assignee: Lomotif Private Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,127

(22) Filed: Mar. 9, 2020

(65) Prior Publication Data

US 2020/0302971 A1 Sep. 24, 2020

Related U.S. Application Data

(63) Continuation of application No. 16/554,977, filed on Aug. 29, 2019, now Pat. No. 10,593,367, which is a continuation of application No. 16/358,416, filed on Mar. 19, 2019, now Pat. No. 10,468,064.

(51) Int. Cl.
| | |
|---|---|
| *H04N 9/80* | (2006.01) |
| *G11B 27/034* | (2006.01) |
| *H04N 21/439* | (2011.01) |
| *H04N 21/43* | (2011.01) |
| *G06F 16/635* | (2019.01) |
| *H04N 5/783* | (2006.01) |

(52) U.S. Cl.
CPC ......... *G11B 27/034* (2013.01); *G06F 16/635* (2019.01); *H04N 21/4307* (2013.01); *H04N 21/439* (2013.01)

(58) Field of Classification Search
CPC . G06F 16/635; G11B 27/034; H04N 21/4307; H04N 21/439
USPC ................ 386/248, 239, 224, 326, 337, 341
See application file for complete search history.

(56) References Cited

U.S. PATENT DOCUMENTS

| | | | | |
|---|---|---|---|---|
| 7,823,056 | B1 * | 10/2010 | Davey | .................... G11B 27/34 715/202 |
| 8,311,399 | B2 | 11/2012 | Dui et al. | |
| 9,454,993 | B1 * | 9/2016 | Lawson | ........... H04N 21/47205 |
| 2008/0263592 | A1 | 10/2008 | Kimber et al. | |
| 2010/0086280 | A1 | 4/2010 | Sabo | |

(Continued)

*Primary Examiner* — Robert Chevalier
(74) *Attorney, Agent, or Firm* — American Patent Agency PC; Daniar Hussain; Xiaomeng Shi

(57) ABSTRACT

In the field of media editing, in one embodiment, a computer-implemented method may include steps for presenting a representation of a video at a user device; receiving a user selection of a selected portion of the video at a first time; generating a reversed video portion based on the selected portion; and combining at least a first portion of the video and a second portion of the reversed video portion to produce the media file. In some embodiments, the method further comprises receiving a user input at the user device, the user input indicative of playback of the selected portion of the video in a forward direction and in a reverse direction; updating the reversed video portion based on the user input to yield an updated reversed video portion; and generating instructions to combine the selected portion and the updated reversed video portion to produce the media file.

20 Claims, 15 Drawing Sheets

(56) References Cited

U.S. PATENT DOCUMENTS

| | | | |
|---|---|---|---|
| 2010/0259645 A1* | 10/2010 | Kaplan | G11B 27/105 348/231.99 |
| 2014/0184914 A1 | 7/2014 | Oshima et al. | |
| 2014/0362918 A1 | 12/2014 | Bushell et al. | |
| 2015/0058733 A1 | 2/2015 | Novikoff | |
| 2016/0071524 A1 | 3/2016 | Tammi et al. | |
| 2017/0026719 A1 | 1/2017 | Zhiwen | |
| 2018/0091866 A1 | 3/2018 | Sun et al. | |

* cited by examiner

US 11,100,954 B2

SYSTEMS AND METHODS FOR EFFICIENT MEDIA EDITING

REFERENCE TO RELATED APPLICATIONS

This application is a continuation of and claims priority from non-provisional application having U.S. Ser. No. 16/554,977, filed on Aug. 29, 2019, and entitled "SYSTEMS AND METHODS FOR EFFICIENT MEDIA EDITING," which itself is a continuation of and claims priority from non-provisional application having U.S. Ser. No. 16/358,416, filed on Mar. 19, 2019, and entitled "SYSTEMS AND METHODS FOR EFFICIENT MEDIA EDITING," the entire disclosures of all of which are hereby incorporated by reference in their entireties herein.

This application is also related to commonly-owned non-provisional application having U.S. Ser. No. 15/185,636, filed on Jun. 17, 2016, and entitled "METHOD FOR GENERATING A COMPOSITION OF AUDIBLE AND VISUAL MEDIA," the entire disclosure of which is hereby incorporated by reference in its entirety herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the U.S. Patent and Trademark Office files or records, but otherwise reserves all copyright and trade dress rights whatsoever.

FIELD OF THE INVENTION

Embodiments of the present invention are generally directed to systems and methods for media editing on a mobile device.

BACKGROUND OF THE INVENTION

Media recording technology may serve to generate audio (e.g., music) and video using microphones to capture sound information and cameras to capture image information. Further, digital media generated by the media recording technology can be read and reproduced non-destructively so that the recorded video does not degrade over time and can be made available long term for other future reproductions. Content authors can use networks such as the Internet to distribute digital media files, and various streaming media services may provide advertising-based or subscription-based services online for playback on various types of computing devices.

Editing of media content by end users is an expected functionality for many end-user applications. Currently, media editing on resource constrained mobile devices is highly inefficient, leading to significant user frictions and accordingly, reduced user engagement. However, efficient media editing on resource-constrained mobile devices is critical for mass user adoption of new media applications.

The aforementioned difficulties of media editing result in unsatisfactory experiences for end-users as well as technical difficulties with computationally efficient editing of media files on resource-constrained mobile devices.

It is against this background that the present invention was developed.

BRIEF SUMMARY OF THE INVENTION

The following presents a summary to provide a basic understanding of one or more embodiments of the disclosure. This summary is not intended to identify key or critical elements, or to delineate any scope of particular embodiments or any scope of the claims. Its sole purpose is to present concepts in a simplified form as a prelude to the more detailed description that is presented later. In one or more embodiments described herein, systems, computer-implemented methods, apparatuses and/or computer program products that provide for efficient mixing and reversing of videos are described. In particular, a system for producing a media file is described. The system may include a non-transitory, computer-readable medium containing program code and a processor that executes the program code to perform various stages.

The stages may include receiving a file at a user device, the file including a video, and presenting a representation of the video at the user device. The stages may further include receiving a user selection indicative of a scrubbable (e.g., editable) portion of the video at a first time and generating a reversed video portion at the first time based on the scrubbable portion. The stages may include receiving a scrubbing input (e.g., user remixing input) and a playback speed at the user device, the scrubbing input indicative of playback of the scrubbable portion of the video in a forward direction and in a reverse direction. Moreover, the stages may include generating a scaling factor between the scrubbing input and the playback speed and scaling the reversed video portion based on the scaling factor to yield a scaled reversed video portion. The stages may include generating instructions to combine the video and the scaled reversed video portion. Moreover, artificial intelligence (AI) may be used to variously improve upon the selection of videos and/or portions of the video by the user, for example, by suggesting videos to the user based on a user's profile.

Other embodiments include corresponding systems, apparatus, and computer programs, configured to perform the various operations, encoded on computer storage devices.

These and other embodiments can each optionally include one or more of the following features. Embodiments may include instructions for combining a first portion of the video that occurs before the scrubbable portion, the scaled reversed video portion, and a second portion of the video including the scrubbable portion and a remainder of the video. Further, the system and method may compress the second portion. The system and method may present a preview of the media file at the user device based on the scrubbing input. In some examples, the file may further include existing audio, and the system and method may process the file to filter the existing audio. The disclosed systems may receive an audio file at the user device and may generate a reversed audio portion of the audio file at the first time. Moreover, the audio file may be selected from a database of audio files. The disclosed systems may scale the reversed audio portion based on the scaling factor to yield a scaled reversed audio portion. The disclosed systems may generate instructions to combine the video, the scaled reversed audio portion, and the scaled reversed video portion.

Conventional approaches for media editing (e.g., remixing) may involve reversing a video after obtaining segment timings from the user in order to reduce the inefficiencies of reversing a video. However, such approaches may still take a relatively longer time to render the videos as compared with the techniques and systems described herein. In contrast, the present system and method may generate similar output in less time at least by removing the need for obtaining the segment timings before initiating the reversing process. Moreover, conventional approaches may reverse a video after obtaining segment timings from the user and may have to repeat the reversing process again if the user tries to perform a redo of any of the associated operations. In contrast, the present system and method may reuse the same reversed video regardless of the number of times the user performs such repetitive edits.

Conventional approaches may attempt to speed up the rendering process of the reversed video via downsizing the video or using lower framerates that may result in a reduction in video quality. In contrast, the present invention may not lead to the degradation of video quality. In other aspects, conventional approaches may circumvent the traditional video reversal processes by storing the individual frames for reversed playback. However, in addition to needing an increased memory footprint, such an approach may not necessarily work with pre-existing videos. In contrast, the disclosed systems may not have such a restriction.

Particular embodiments of the subject matter described herein can be implemented so as to realize one or more of the following advantages: Increasing the computationally efficiency and providing near real time remixing of multimedia files, with the capability of being executed on a mobile device; Execution of more computationally intensive techniques in background processes thereby enabling multitasking; Reducing the need for the use of specialized cameras; Reducing the need for the storage of individual video frames in a video selection, thereby reducing the memory footprint and increasing processing efficiencies; and Providing the ability to implement media editing with any pre-existing video, and not only curated videos or videos shot in particular environments using particular systems. These are not the only advantages that may be obtained by the particular embodiments described herein, and there may be other inherent advantages as would become evident to one of skilled in the art from a review of this disclosure.

In summary, in one aspect, one embodiment of the present invention is a computer-implemented method for producing a media file, comprising steps of receiving a file at a user device, the file including a video; presenting a representation of the video at the user device; receiving a user selection indicative of a scrubbable portion of the video at a first time; generating a reversed video portion at the first time based on the scrubbable portion; receiving a scrubbing input and a playback speed at the user device, the scrubbing input indicative of playback of the scrubbable portion of the video in a forward direction and in a reverse direction; generating a scaling factor between the scrubbing input and the playback speed; scaling the reversed video portion based on the scaling factor to yield a scaled reversed video portion; and generating the media file by combining the video and the scaled reversed video portion.

In another aspect, another embodiment of the present invention is a system for producing a media file, comprising a non-transitory, computer-readable storage medium storing program code; and a processor that executes the program code to perform operations to receive a file at a user device, the file comprising a video; present a representation of the video at the user device; receive a user selection indicative of a selected portion of the video at a first time; generate a reversed video portion at the first time based on the selected portion; and generate instructions to combine the video and the reversed video portion to produce the media file.

In some aspects, the operations further comprise to receive a user input at the user device, the user input indicative of playback of the selected portion of the video in a forward direction and in a reverse direction; update the reversed video portion based on the user input to yield an updated reversed video portion; and generate instructions to combine the selected portion and the updated reversed video portion to produce the media file. In some aspects, updating the reversed video portion comprises scaling the reversed video portion based on a scaling factor based on the user input.

In some aspects, the operations further comprise to execute the instructions to combine the video and the reversed video portion to produce the media file.

In some aspects, the instructions comprise additional instructions to combine a first portion of the video that occurs before the selected portion, the reversed video portion, and a second portion of the video including the selected portion and a remainder of the video.

In some aspects, the instructions comprise additional instructions to compress the second portion.

In some aspects, the operations further comprise to present a preview of the media file at the user device.

In some aspects, the file further comprises existing audio, and the operations further comprise to process the file to filter the existing audio.

In some aspects, the operations further comprise to receive an audio file at the user device, wherein the audio file is selected from a database of audio files; and generate a reversed audio portion of the audio file at the first time.

In some aspects, the instructions comprise additional instructions to combine the video, the reversed audio portion, and the reversed video portion.

In some aspects, generating the reversed video portion at the first time based on the selected portion is performed in a background process while the user is performing editing operations on the user device.

In yet another aspect, another embodiment of the present invention is a system for media editing, the system comprising a user device having a display, a camera, and a first memory; a server comprising a second memory and a data repository; a telecommunications-link between the user device and the server; and a plurality of computer codes stored on the first memory and the second memory respectively, where the plurality of computer codes when executed causes the server and user device, independently and/or in conjunction, to execute a process comprising the aforementioned steps.

In yet another aspect, yet another embodiment of the present invention is a computerized server comprising at least one processor, a memory, and computer codes stored thereon. The server when connected to a user device, and the computer codes when executed by the processor, causes the processor to execute a process comprising the aforementioned steps.

In yet another aspect, yet another embodiment of the present invention is a computer-implemented method that includes steps for presenting a representation of a video at a user device; receiving a user selection of a selected portion of the video at a first time; generating a reversed video portion based on the selected portion; and combining at least a first portion of the video and a second portion of the reversed video portion to produce the media file.

Yet other aspects and embodiments of the present invention include the methods, processes, and algorithms comprising the steps described herein, and also include the processes and modes of operation of the systems and servers described herein.

Features from any of the embodiments described herein may be used in combination with one another in accordance with the general principles described herein. The details of one or more embodiments of the subject matter described herein are set forth in the accompanying drawings and the description below. Other features, aspects, and advantages of the subject matter will become apparent from the description, the drawings, and the claims.

BRIEF DESCRIPTION OF THE DRAWINGS

Having thus described the disclosure in general terms, reference will now be made to the accompanying drawings, which are not necessarily drawn to scale, described briefly below.

Figure 1:
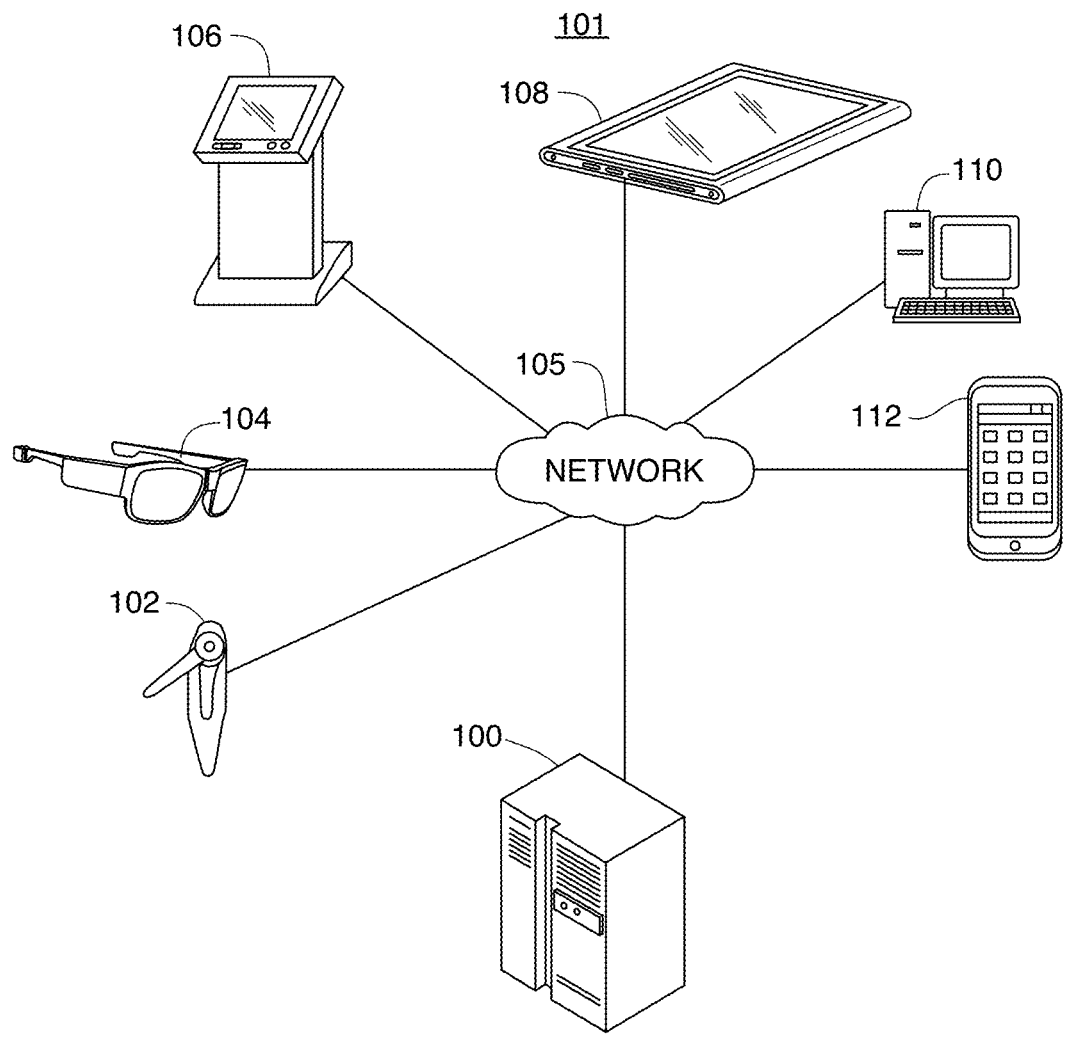

FIG. 1 is an overview of a system that can be used to practice embodiments of the present disclosure.

Figure 2:
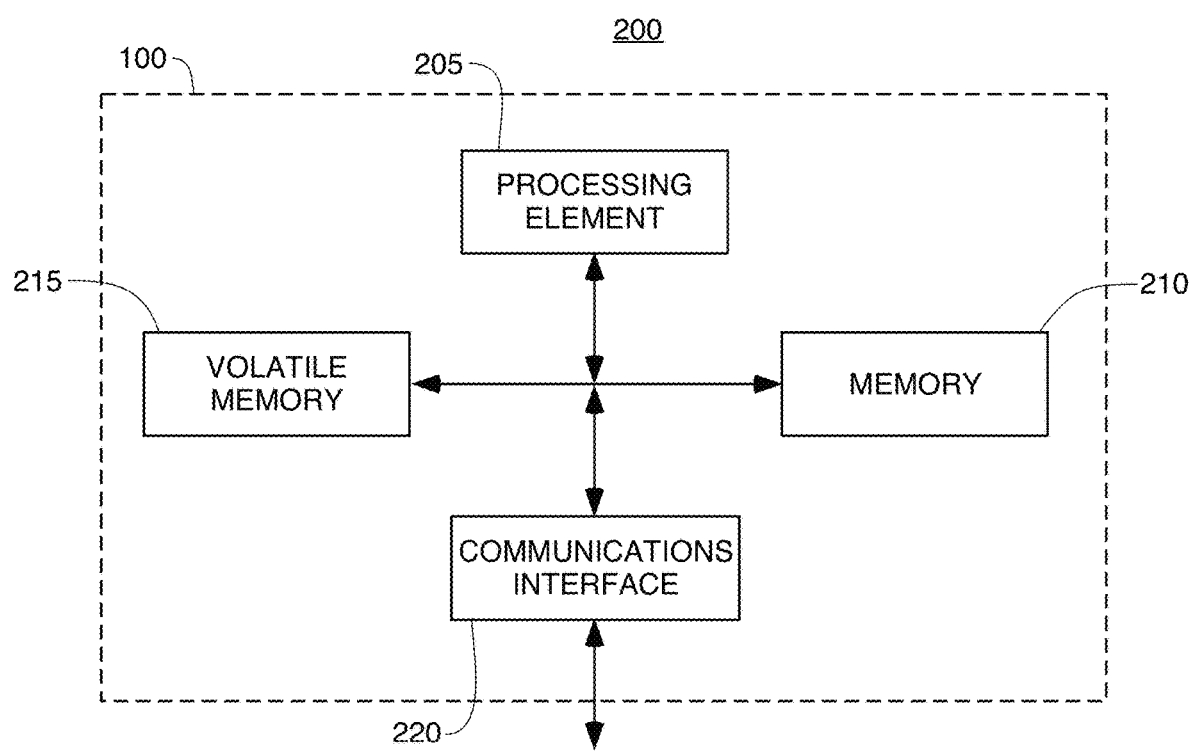

FIG. 2 is an exemplary schematic diagram of a management computing entity, in accordance with example embodiments of the disclosure.

Figure 3:
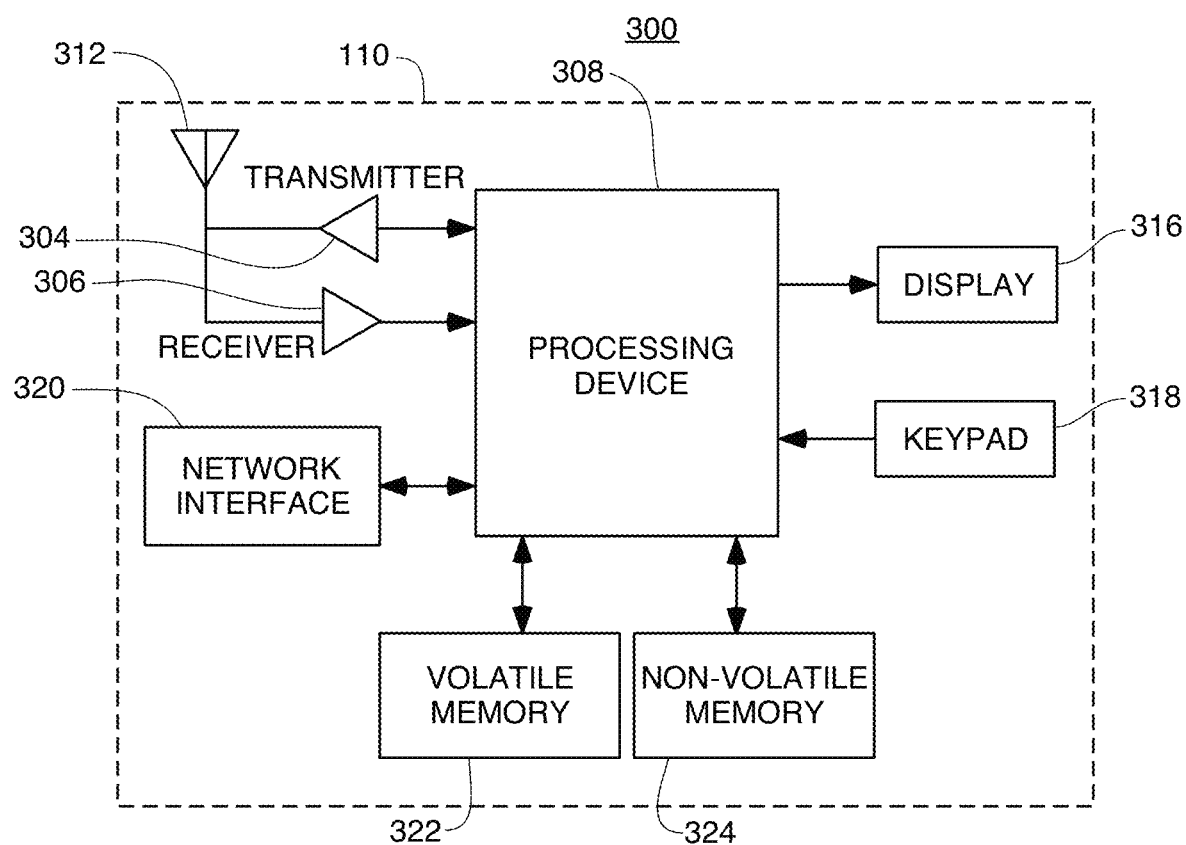

FIG. 3 is an exemplary schematic diagram of a user computing entity, in accordance with example embodiments of the disclosure.

Figure 4:
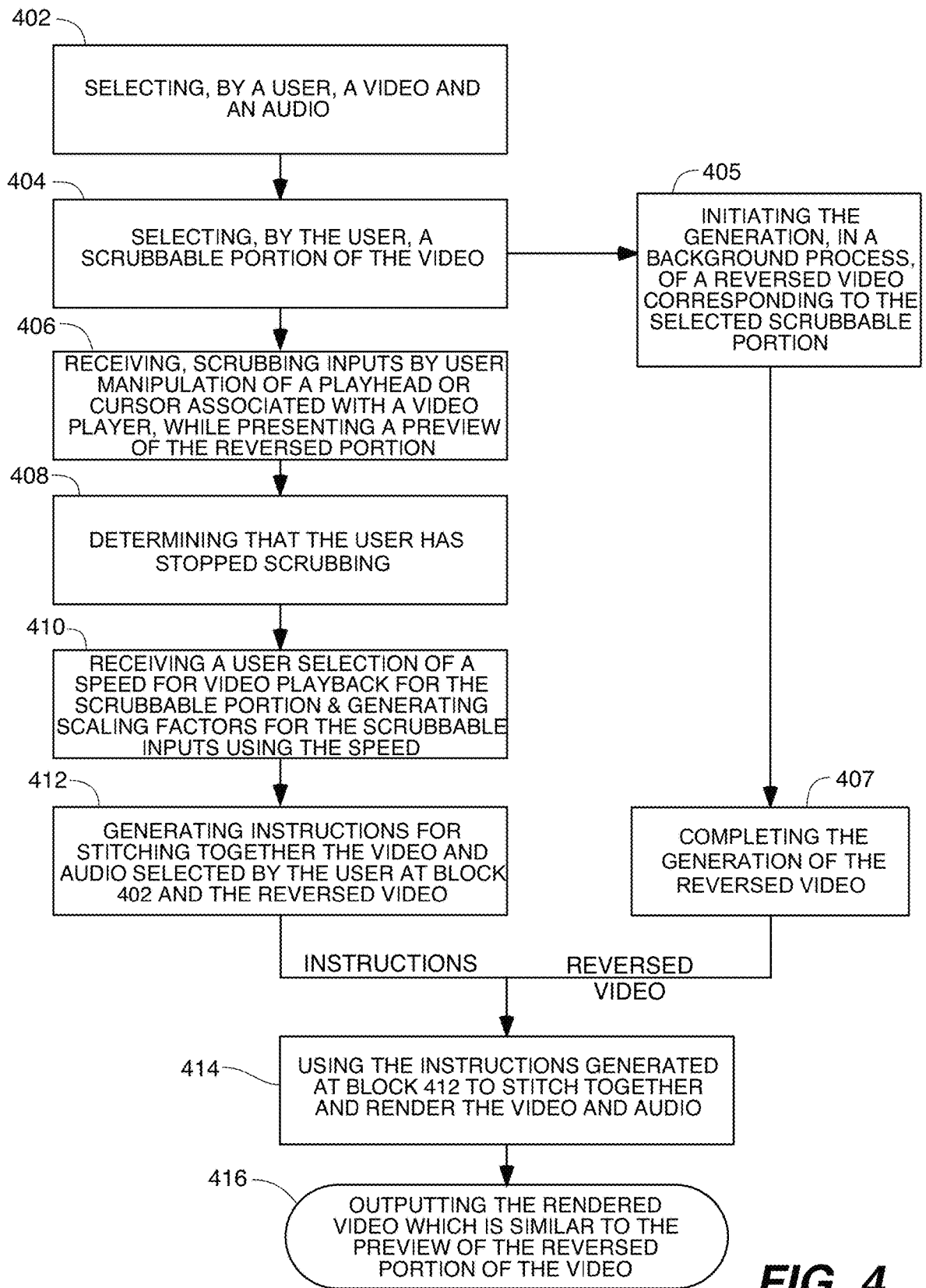

FIG. 4 shows an exemplary method representing the operation of the disclosed systems, in accordance with example embodiments of the disclosure.

Figure 5A:
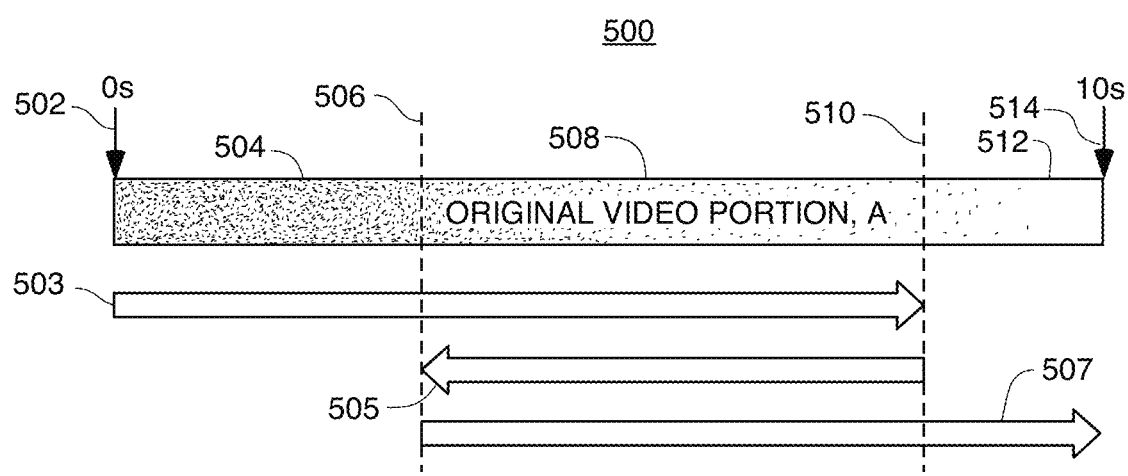

FIG. 5A shows a timeline of a video for editing using the disclosed techniques and operations, in accordance with example embodiments of the disclosure.

Figure 5B:
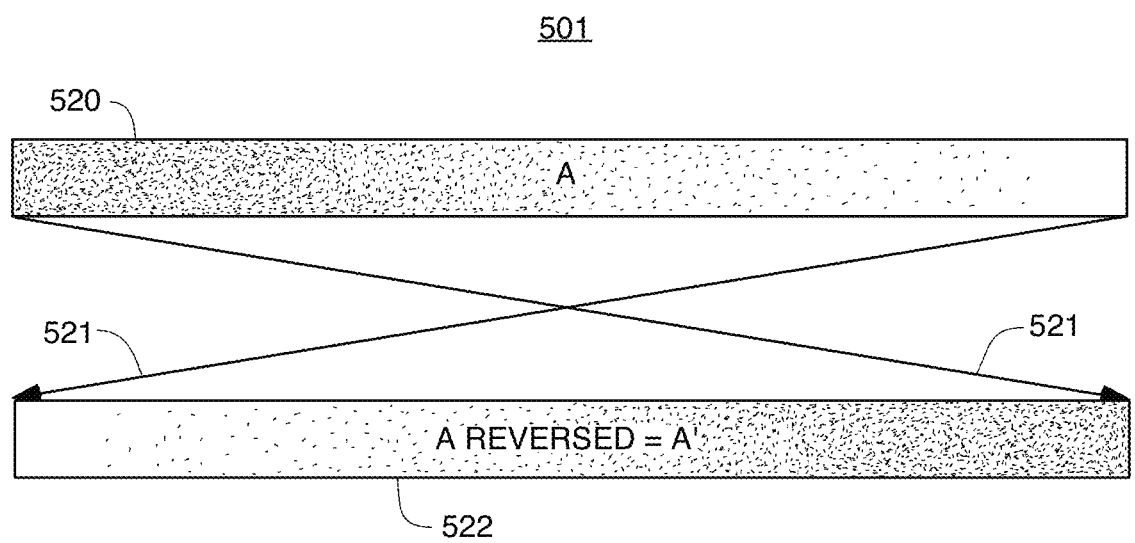

FIG. 5B illustrates the relationship between a portion of a video A and a reversed portion of the same video A' using the disclosed systems and techniques, in accordance with example embodiments of the disclosure.

Figure 6:
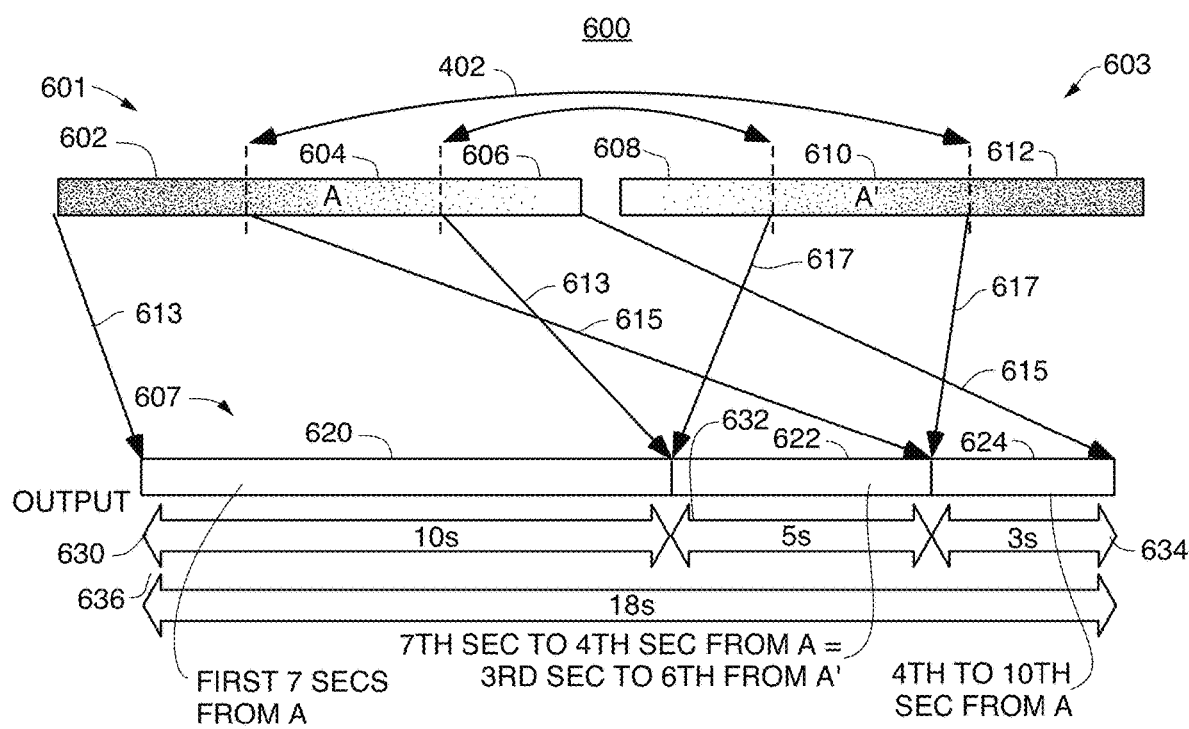

FIG. 6 illustrates a more detailed representation of video reversal and stitching, in accordance with example embodiments of the disclosure.

Figure 7A:
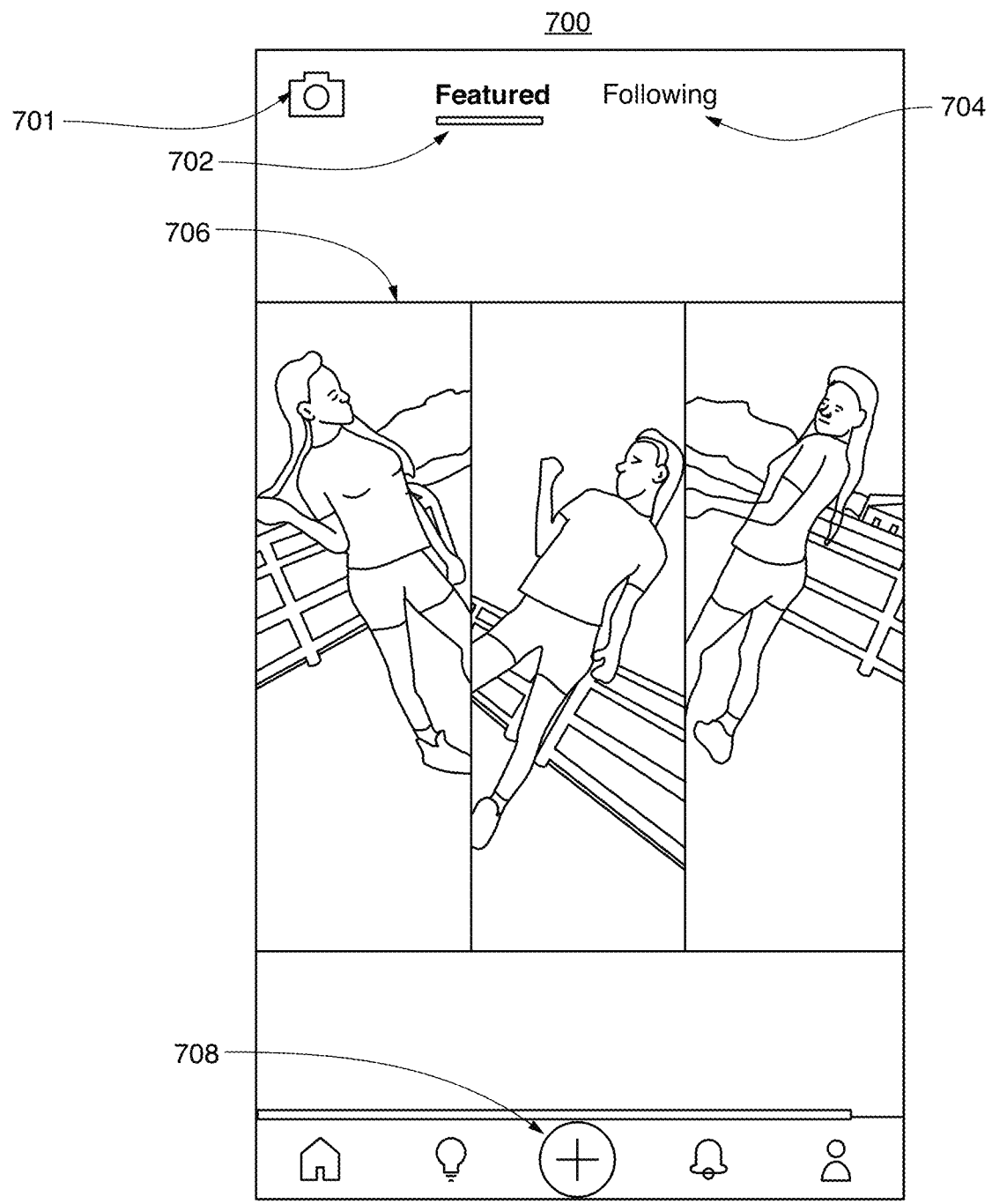
Figure 7B:
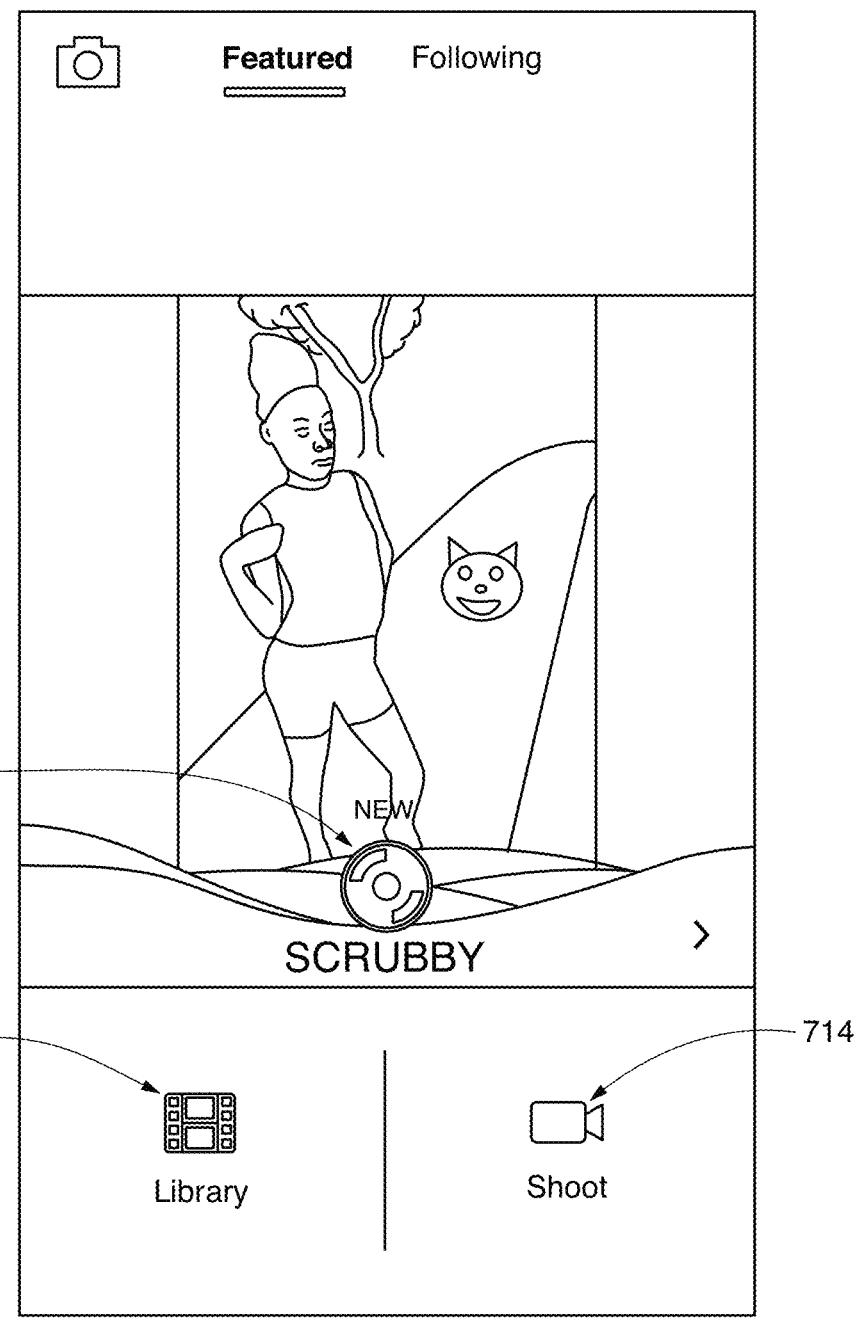

FIGS. 7A and 7B show diagrams of an exemplary screenshot of an application executed on a mobile device, in accordance with example embodiments of the disclosure.

Figure 8A:
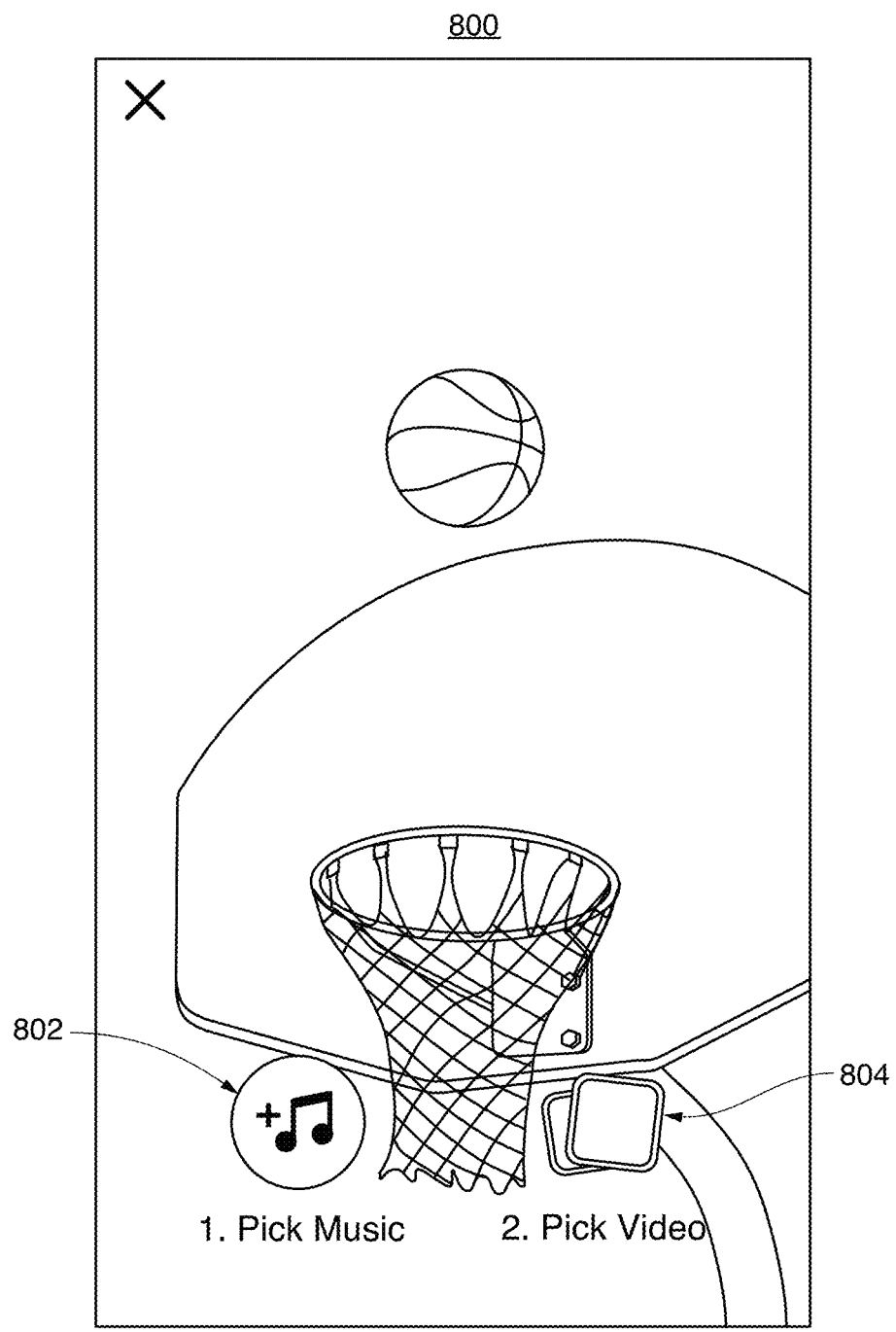
Figure 8B:
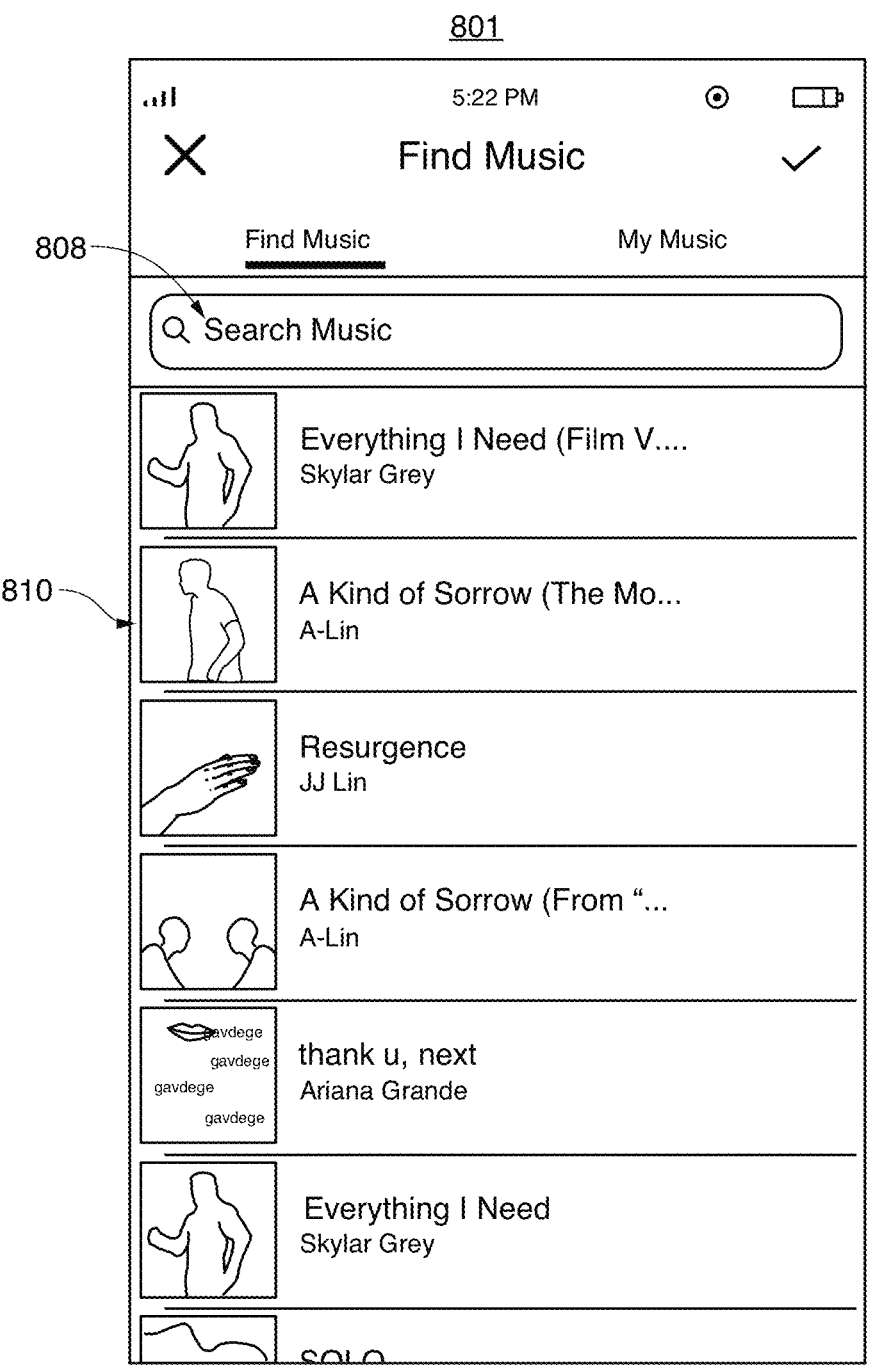

FIGS. 8A and 8B show diagrams of another exemplary screenshot of the application, in accordance with example embodiments of the disclosure.

Figure 9A:
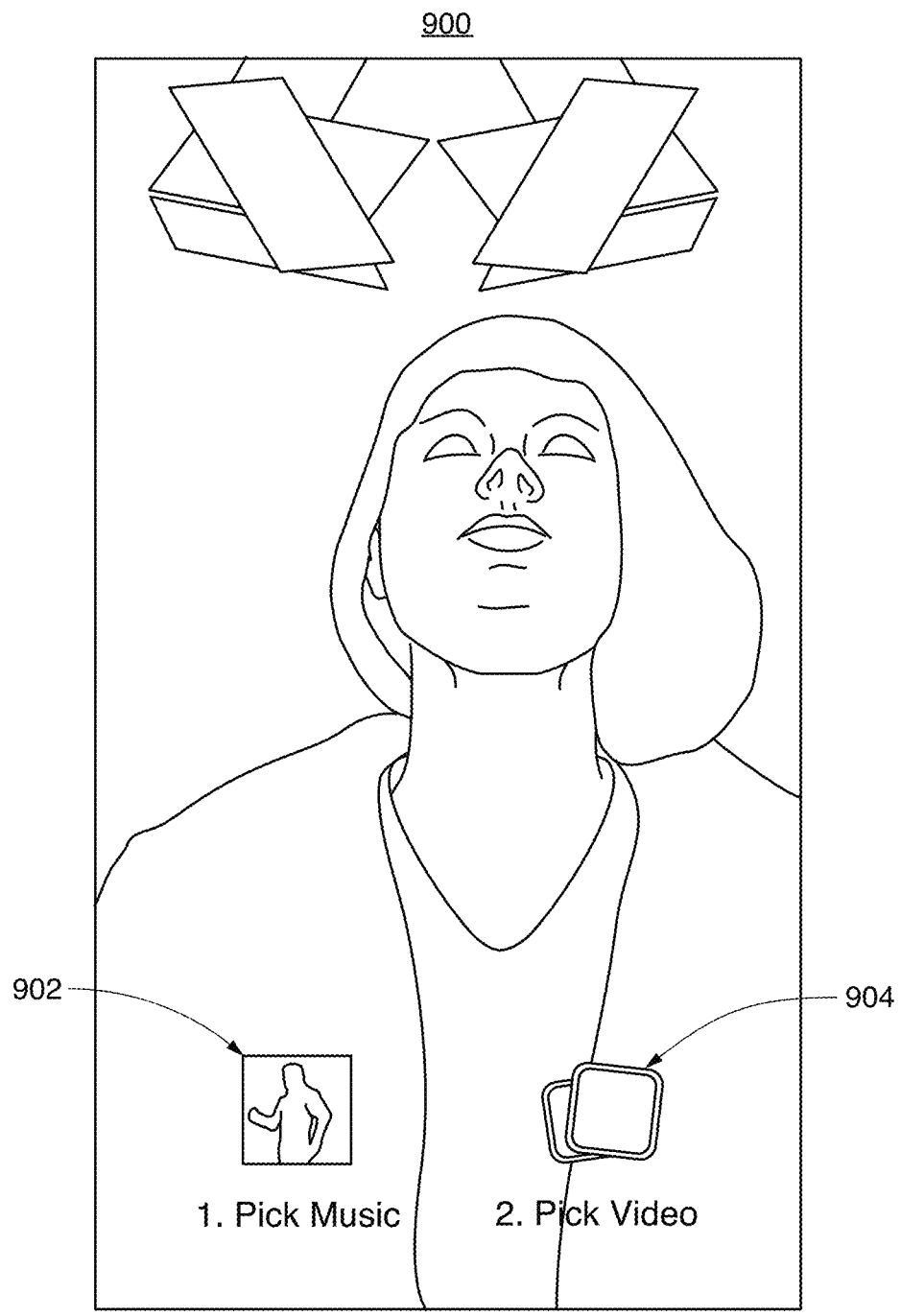
Figure 9B:
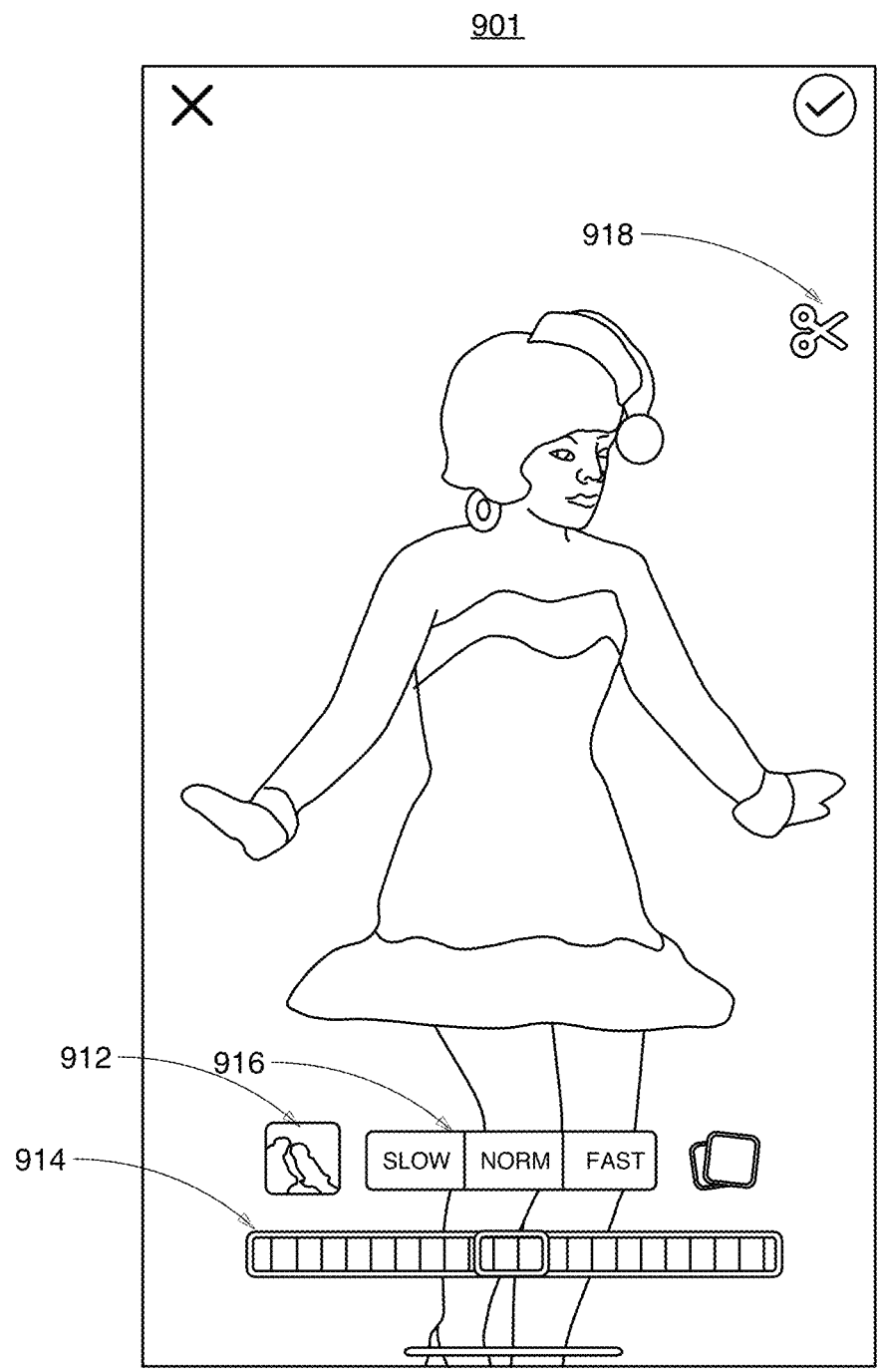
Figure 9C:
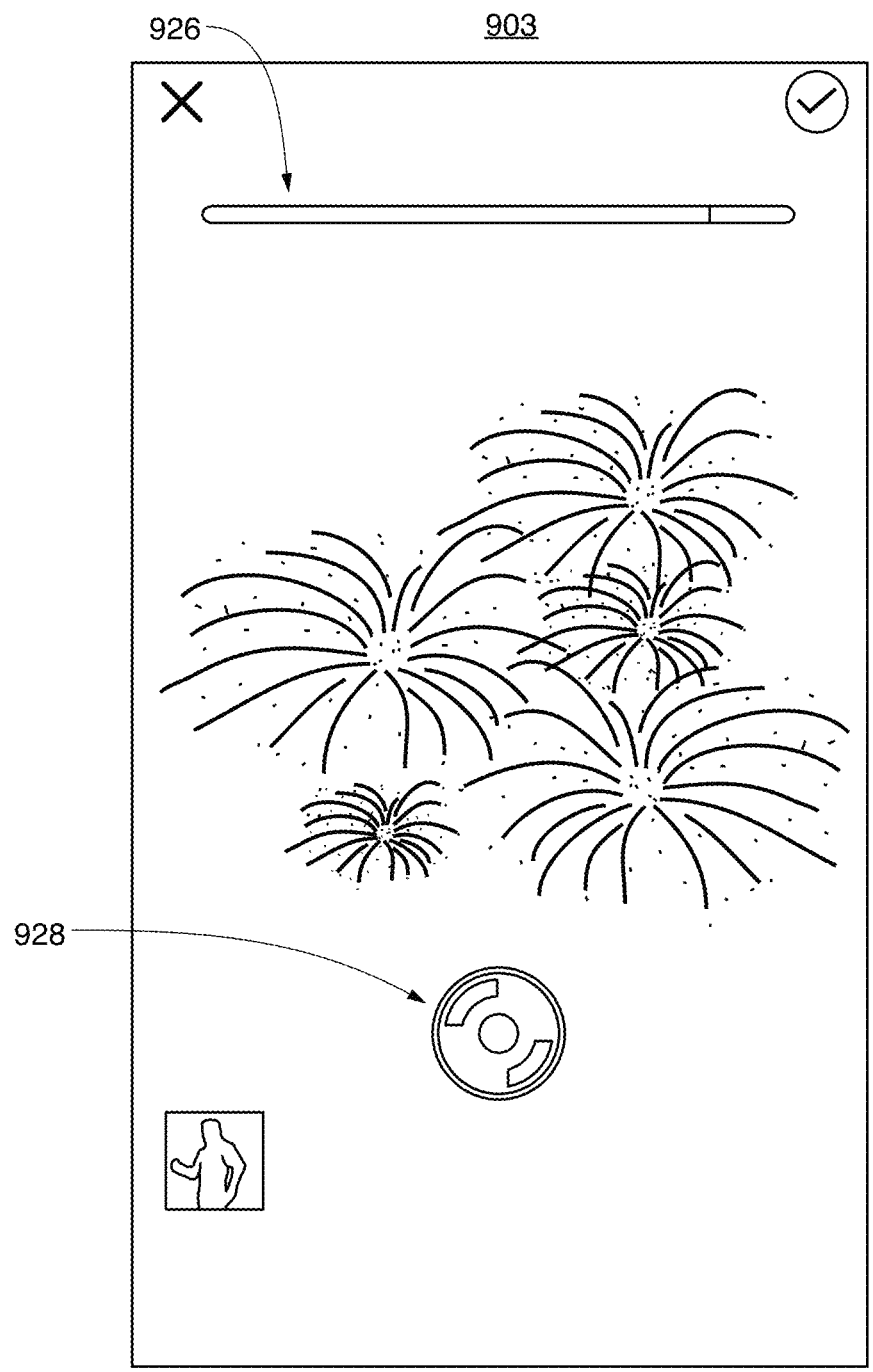

FIGS. 9A, 9B, and 9C show diagrams of another exemplary screenshot of the application, in accordance with example embodiments of the disclosure.

Figure 10:
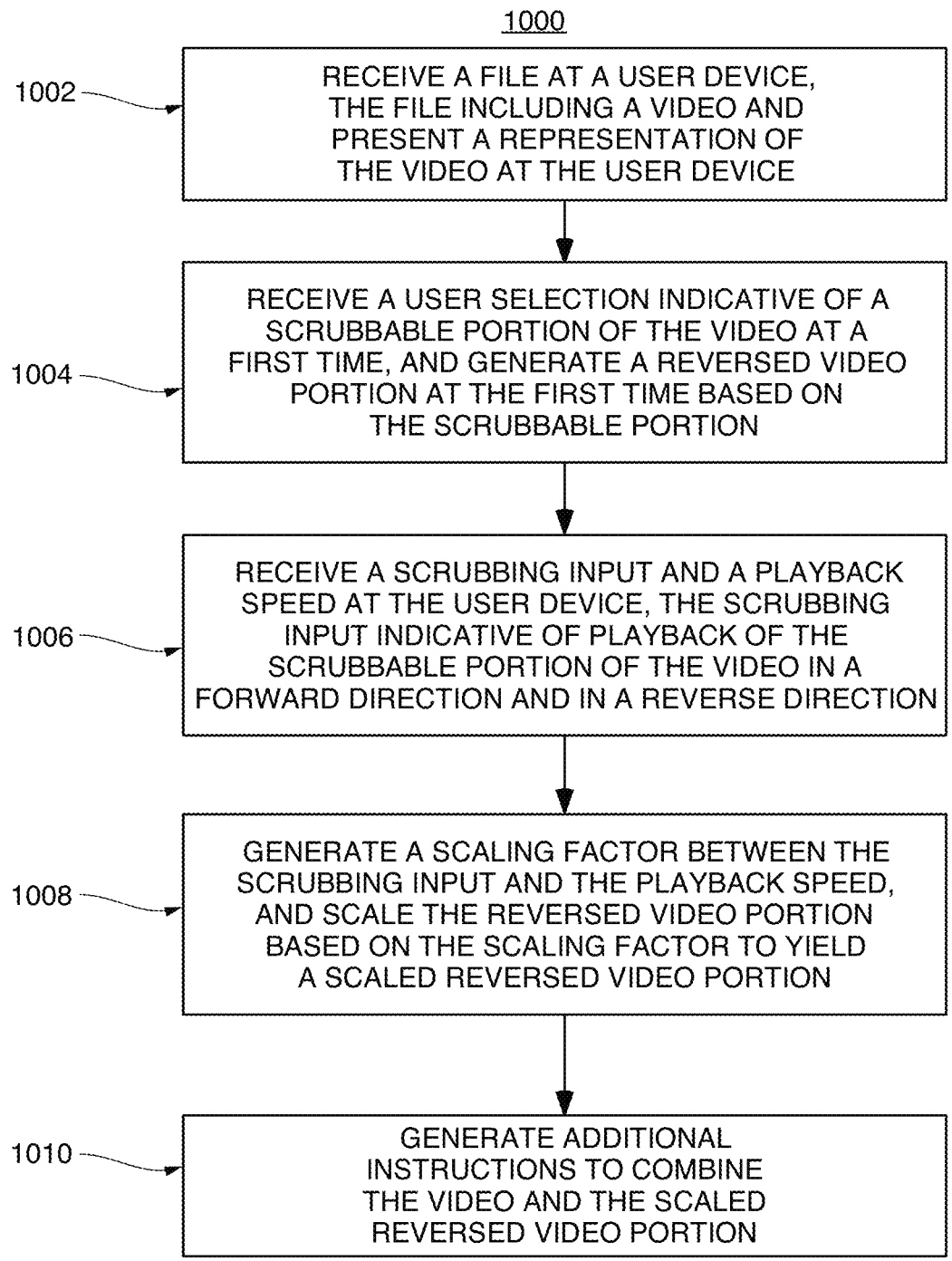

FIG. 10 is an illustration of an exemplary method that describes representative operations for video editing, in accordance with example embodiments of the disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

Detailed Description of Various Embodiments

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, one skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to refer to examples with no indication of quality level. Like numbers refer to like elements throughout.

I. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration 101 of an exemplary embodiment of the present disclosure. As shown in FIG. 1, this particular embodiment may include one or more management computing entities 100, one or more networks 105, and one or more user computing entities 102, 104, 106, 108, 110, and 112 (hereinafter, represented by representative user computing entity 110). Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

A. Exemplary Management Computing Entity

FIG. 2 provides a schematic 200 of a management computing entity 100 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user computing entities 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the components of the management computing entity 100 may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for exemplary purposes only and are not limiting to the various embodiments.

B. Exemplary User Computing Entity

A user may be an individual, a family, a company, an organization, an entity, a department within an organization, a representative of an organization and/or person, and/or the like. In one example, users may be carrier personnel, consignors/shippers, consignees/recipients, and/or the like. For instance, a user may operate a user computing entity 110 that includes one or more components that are functionally similar to those of the management computing entity 100. FIG. 3 provides an illustrative schematic 300 representative of a user computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the management computing entity 100. In a particular embodiment, the user computing entity 110 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the management computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the management computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the management computing entity 100 and/or various other computing entities.

In another embodiment, the user computing entity 110 may include one or more components or functionality that are the same or similar to those of the management computing entity 100, as described in greater detail above. As will be recognized, these architectures and descriptions are provided for exemplary purposes only and are not limiting to the various embodiments.

III. Exemplary System Operation

As described above, the management computing entity 100 and/or user computing entity 110 may be configured to coordinate the operations associated with editing media files including scrubbing videos and audio files, as will be detailed further below.

As used herein, a "frame" may refer to one of the many still images which together compose a video.

As used herein, a "frame rate" may refer to the frequency (rate) at which consecutive frames (images) appear on a display. Frame rate may be expressed in frames per second (fps). Frame rate may also be called the frame frequency and be expressed in Hertz units (seconds$^{-1}$).

As used herein, "editing" may refer to the manipulation and arrangement of portions of a media file such as a video. Further, "remixing" may refer to the process of generating a piece of media which has been altered from its original state by adding, removing, and/or changing (e.g., reversing) portions of the media.

As used herein, a "timeline" in video editing may refer to is a commonly used interface found in most video editing programs. The timeline interface enables user to lay a video project out in a linear fashion horizontally across a display. The timeline may include specific times associated with each frame of the video, which can allow for the frame to be tracked during editing.

As used herein, "multitasking" in computing may refer to the concurrent execution of multiple tasks (also known as processes) over a certain period of time. New tasks can interrupt already started ones before they finish, instead of waiting for them to end. As a result, a computer executes segments of multiple tasks in an interleaved manner, while the tasks share common processing resources such as central processing units (CPUs) and main memory. A related concept may include that of a "background process." In particular, a background process as used herein may refer to a computer process that runs behind the scenes (i.e., in the background) and without user intervention. The background process may include a child process created by a control process for processing computing task. After the creation, the child process may run on its own course for performing the task independent of the control process, therefore, the control process is free of performing other designated tasks. As detailed below, the user computing entity 110 may use multitasking to implement background processes for video reversal of a portion of a video corresponding to a scrubbing activity of a user.

As used herein, "stitching" may refer to the process of combining multiple edited video portions together to generate a composite video having a predetermined viewing sequence for the edited video portions. The stitching may be performed at the end of a video editing session and may be implemented via computer-executable instructions generated by the user computing entity 110 and executed via at least one processor.

As used herein, "scrubbing" may refer to a process in digital video and/or audio editing including a user-device interaction in which the user drags a cursor or playhead across a segment of a representation of a scrubbable portion of the video. The interaction may be indicative of playback of the scrubbable portion of the video in a forward direction and in a reverse direction.

As used herein, "scaling" may refer to time stretching or time compressing a portion of a video and/or an audio file. Time stretching or digital slow motion may be achieved by inserting new frames in between frames that have actually been imaged. The new frames may be fabricated and may include repeats of the preceding frames, but more often they are created by interpolating between frames. Time stretching may use any of a number of algorithms to track motion between frames and generate intermediate frames within a given scene for producing a time stretching effect. Further, the opposite of slow motion is fast motion; the frequency at which film frames are captured (the frame rate) may be more spread out than the frequency used to view the sequence. When played at normal speed, time may appear, to an observer, to be moving faster. For example, an image of a scene may be captured at 1 frame per second, but then played back at 30 frames per second; the result may be an apparent 30 times speed increase. As the frame rate of time-lapse approaches normal frame rates, such time-lapse may sometimes be referred to simply as fast motion or (in video) fast forward.

As used herein, a "scaling factor" may refer to a parameter that is used to determine the degree of compression or stretching of a portion of a video over a given duration. For example, a scaling factor less between 0 and 1 may indicate a relative stretching (e.g., slow-down) of the portion of the video. A scaling factor greater than 1 may indicate a relative compression (e.g., speed up) of the portion of the video. A scaling factor of 1 may indicate the playback of the portion of video at the frame rate that it was originally recorded.

As used herein, "previewing" may refer to a computing function to display a video before it is produced in its final form. In particular, the user computing entity 110 may implement a video preview feature to allow a user to see the current video made during the scrubbing and editing process.

As used herein, "data compression" may refer to the process of reducing the size of a data file such as a video file. Data compression reduce the bit-rate of a video by encoding information using fewer bits than the original representation. In some examples, video files may be compressed using a video codec, a software module that compresses or decompresses digital video. The video codec may convert uncompressed video to a compressed format or vice versa. The compressed data format usually conforms to a standard video compression specification. The compression may be lossy, meaning that the compressed video lacks some information present in the original video. Accordingly, the decompressed video may have lower quality than the original, uncompressed video. Further, the video codecs may be optimized for video playback in the forward direction and not in a reversed direction. Accordingly, reversing a video compressed with a codec may render the decompressed reversed video to have a lower quality.

As used herein, "filtering" may refer to a process that removes some unwanted components or features from a signal such as a signal representing video or audio. Filtering may involve the complete or partial suppression of some aspect of the signal. Most often, this means removing some frequencies or frequency bands. Noise reduction may refer a specific type of filtering in which noise is removed from a signal. Noise may refer to unwanted (and, in general, unknown) modifications that a signal may suffer during capture, storage, transmission, processing, or conversion.

In various aspects, video remixing may be used to generate various visual effects such as playing the video backwards. However, reversing a video may be a time and memory consuming process at least because videos are typically compressed to be rendered forwards, not backwards.

In general, video reversal may be a time- and memory-consuming process. In particular, video reversal may involve interpolating reference frames compressed in a forward-predicted fashion in order to generate the frames in a backward direction. In order to be efficient, one approach is to avoid performing interpolation. Accordingly, this approach may involve recording the user's mixing movements, marking out necessary portions, and reversing those portions. However, this process may be relatively slow. Alternatively, another approach is to store raw frames when capturing, or to use compression algorithms with bi-directional frames to squeeze in more frames. This may serve to avoid the need to derive the frame through interpolation and simply re-order the frames. Unfortunately, such approaches may be computationally or storage intensive.

In some respects, conventional systems may record a video by storing every frame in the video. For example, such systems may store every frame of the video including various keyframes. A keyframe may refer to a frame in which a complete image is stored in the data stream representing the video. In video compression, changes between one frame to the next may be stored in the data stream, to reduce the amount of information that must be stored. Because video compression only stores incremental changes between frames (except for keyframes), it may be difficult to fast forward or rewind to any arbitrary spot in the video stream. That may be because the data for a given frame may only represent how that frame was different from the preceding one.

Conventional systems may be unable to perform video reversal and scrubbing on a given video on a given user device (e.g., a mobile phone) without compromising on the speed and/or the quality of the process. In some cases, conventional systems may simply avoid the need to reverse videos by storing the individual frames. However, this may require the use of a specialized cameras or specialized camera settings to capture the video, and therefore may not work with existing videos shot with ordinary cameras or ordinary settings.

Conventional systems may reduce the number of frames for the video reversal. For example, such system may remove some of the frames prior to video reversal. This may lead to choppy output in the reversed video file, and therefore, a compromised quality. In some respects, conventional systems may compromise on the speed of video reversal to provide a fully reversed video of high quality. However, this may incur significant computational effort and introduce significant delays. Accordingly, such systems may fail to simultaneously provide a fast and high-quality user experience, especially on resource-constrained mobile devices, which comprise the vast majority of end-user devices currently in widespread use. In some cases, conventional systems may upload the video to various external servers over the Internet instead of performing the video reversal natively on a user device. Such servers may then reverse the video using conventional techniques, and the user device may download the video back down from the server. However, such an approach may not work without an active network connection, and may require costly and high-bandwidth usage data transmissions over the network to upload and download the video. Further, as noted, conventional systems may require specialized cameras or special camera settings that captures a series of individual frames, and load the frames into the device memory for re-ordering and rendering.

As noted, in order to reverse pre-existing videos, backwards interpolation may need to be performed. Further, video reversing cannot be avoided, so the amount of time for the video reversal should be minimized. Instead of trying to reduce the amount of video reversing jobs to save time, the disclosed systems may begin performing the video reversal at the earliest opportunity. For example, the user computing entity 110 may begin performing video reversal before the user generates any mixing instructions. Moreover, since at this stage the mixing instructions are yet unknown, the user computing entity 110 may process the entirety of the reversible portion of the video. This fully-reversed video may be edited and combined with other portions of the video to generate a remixed media file in an efficient manner.

More specifically, embodiments of the disclosure are directed to systems and methods to generate a reversed video based on a pre-existing video in a manner to provide a user with a near real-time processing experience. In particular, the user computing entity 110 may include receiving a user selection of a portion of a video and generating a reverse copy of the portion of the video by interpolating the frames of the portion and re-rendering the sequence of frames in reverse. In some examples, the user computing entity 110 may record user's movement of scrubbing (e.g., using their finger to go back and forth on the timeline) while the user is previewing the video. Accordingly, the user computing entity 110 may edit (e.g., cut and stitch together) portions of the original and reversed video. Moreover, the editing may include forming the video according to the times associated with the scrubbing. In another aspect, the video may include videos recorded by a user or obtained via a database (e.g., online database). The disclosed systems may have the advantage of having a smaller storage footprint as every frame of recorded video is not stored in memory, allowing for the processing and scrubbing of videos relatively longer durations in comparison with the durations supported by conventional systems.

In some aspects, the disclosed systems may represent a counter-intuitive approach whereby instead of reversing selected snippets of the video, the user computing entity 110 reverses the entire selected video portion that the user can possibly scrub. Moreover, the disclosed systems may initiate the reversing process in a background process to allow the user to perform multitasking operations. While reversing a video is slow, forward rendering may be comparatively fast. By the time that the user has provided various scrubbing inputs, the reversed video may be generated. Accordingly, at this stage, the user computing entity 110 may have two videos, one video being a mirror copy of the other. The disclosed systems may then interpolate these two videos according to the user's movement. Moreover, rendering the two videos together may be a computationally efficient and quick operation because the user computing entity 110 interpolates them in a forward (and not reversed) fashion. By performing the more computationally taxing tasks in the background using less information (e.g., without the scrubbing instructions), the disclosed systems may provide the users with a seamless editing experience. From the user's point of view, when the user scrubbing input is provided, the scrubbed video may be provided immediately thereafter (e.g., within a few seconds).

In contrast with conventional systems variously described above, the user computing entity 110 may operate on any existing videos without a need for a special camera. Further, the disclosed systems do not introduce delays or additional computational effort via third-party devices, and do not compromise on the quality of the reversed video. Further, the disclosed systems provide a video timeline that allows for remixing by a user that works with any pre-existing video. Further, the disclosed systems provide a near real-time rendering of the reversed video using previews.

FIG. 4 shows an exemplary method representing the operation of the disclosed systems. In particular, diagram 400 generally represents a workflow for reversing a portion of a video while the user is remixing the video by scrubbing a video timeline. As detailed below, the user computing entity 110 may begin reversing the remixable portion of the video in a background process.

At block 402, the method includes selecting, by a user, a video and an audio (e.g., music file). In some examples, the user may select the video and/or audio from a repository on the user's device (mobile phone, laptop, tablet, etc.). In other examples, the user may select the video and/or audio from an online database. For instance, the user may select the video from a social media platform. The user may also select the audio from an online database containing numerous music files.

At block 404, the method includes selecting, by the user, a scrubbable portion of the video. In some examples, the user may select the scrubbable portion of the video by making various interactive motions with a display of the user's device. For example, the user may use a finger to indicate the beginning of the scrubbable portion and may drag a marker or a cursor to indicate the end of the scrubbable portion.

At block 405, the method includes initiating the generation, in a background process, of a reversed video corresponding to the selected scrubbable portion at block 404. In particular, the generation of the reverse video may be an example of multitasking by the disclosed systems. Further, the initiation of the generation of the reversed video in a background process may serve to allow the user to continue interacting with the disclosed systems, thereby providing a continuous and uninterrupted service to the user.

At block 406, the method includes receiving, scrubbing inputs by user manipulation of a playhead or cursor associated with a video player while presenting a preview of the reversed portion of the video. In particular, the user may use their finger to interact with the display of the user device in order to indicate the scrubbing inputs. For instance, in the case of a mobile app, the user may press their finger against the display and move their finger toward the left and the right of the display while the display presents a timeline of the video. The user computing entity 110 may thereby translate the movements of the user's finger into scrubbing inputs. For example, when the user's finger is moving to the left, the user computing entity 110 may translate this motion into a reverse video instruction. Alternatively, when the user's finger is moving to the right, the user computing entity 110 may translate this motion into a forward video playback instruction. Moreover, based on the speed of the fingers motion and/or any pauses between the leftward motion and the rightward motion of the user's finger, the user computing entity 110 may determine particular times associated with the video frames to initiate the reversed or forward playback. While one example interaction with a mobile app as described above, the user may interact with other computing systems (e.g., computers, tablets, laptops, etc.) using any suitable input method, including but not limited to a keyboard, a mouse, and/or the like. In some examples, when the user is finished providing a set of scrubbing inputs, the user computing entity 110 may, upon the completion of at least a portion of the of the video reversal, present a preview of the reversed portion of the video. In some examples, the preview may not be a full-resolution version of the video in reverse, but rather, may be a lower-resolution version that may be more computationally efficient to display. Moreover, the preview may be displayed in a smaller section of the display as compared with the application itself.

At block 407, the method includes completing the generation of the reversed video initiated at block 405. As noted, the reversed video may be generated while the user is interacting with the disclosed systems, thereby increasing the efficiency of user interaction. Some of these interactions are detailed below with regards to blocks 408 to 410.

At block 408, the method includes determining that the user has stopped scrubbing. The user computing entity 110 may determine that the user has stopped scrubbing by analyzing the continuity of user interactions. For instance, the user computing entity 110 may determine that the user has made a continuous motion with the user's finger on a display screen indicative of the scrubbing inputs and has remove their finger from the screen for a threshold duration of time (e.g., two seconds). Alternatively or additionally, the user computing entity 110 may provide a button or similar input option that allows the user to explicitly communicate that the user is done providing the scrubbing inputs.

At block 410, the method includes receiving a user selection of a speed for video playback for the scrubbable portion and generating scaling factors for the scrubbable inputs using the speed. In particular, the user computing entity 110 may provide a dialog box or similar input screen whereby the user may enter a playback speed. For example, the user may indicate that the speed of video playback for the scrubbable portion should be approximately two times the original speed of the video. Accordingly, the management computing entity 100 may generate a scaling factor of two for the scrubbable inputs that are indicative of a times-two increase playback speed for the scrubbable portion of the video.

At block 412, the method includes generating instructions for stitching together the video and audio selected by the user at block 402 and the reversed video generated at block 407. In some examples, the instructions may be generated by the user computing entity 110 in accordance with any suitable programming language. In particular, the instructions may have a particular syntax and structure that may facilitate the execution of such instructions by a processor in communication with memory. Examples of such instructions will be provided in connections with various exemplary use cases, described below.

At block 414, the method includes using the instructions generated at block 412 to stitch together and render the video and audio selected by the user at block 402 and the reversed video generated at block 407. In this manner, the user computing entity 110 may generate a media file which may represent a scrubbed music video including audio and video components. Moreover, the user may use the user computing entity 110 to generate such a scrubbed music video on their user device (e.g., mobile device), without the need for extensive computational resources.

At block 416, the method includes outputting the rendered video which is similar to the preview of the reversed portion of the video presented at block 406. The user computing entity 110 may render the video at a user device for presentation to the user. In some examples, the user may provide feedback as to the quality of the reversed video. The feedback may be used by one or more operators of the disclosed systems to improve the quality of video reversal techniques described variously herein. In the embodiment described in FIG. 4, the user computing entity 110 is described as performing the process steps. However, other embodiments of the present invention include the management computing entity 100 performing one, or more, or all, of the process steps described herein.

FIG. 5A shows a timeline of a video for editing using the disclosed techniques and operations. In particular, diagram 500 shows a timeline 508 of a portion of a video A. The timeline 508 may include a start time 502, shown in this example as zero seconds. The timeline 508 may include a finishing time 514, shown in this example as being at the ten-second mark. Further a first marker 506 and a second marker 510 may be generated as a result of a user's scrubbing input. For example, the user may move their finger back and forth on a visual representation of the portion of the video A, stopping the movement at locations corresponding to the two markers 506 and 510. In this example, the scrubbing may designate the timeline 508 to include a first portion 503 for forward playback, a second portion 505 for reverse playback, and a third portion 507 for forward playback. Further, the first portion 503 may represent a segment of the video starting at the start time 502 and ending at the second marker 510. The second portion 505 may represent a segment of the video starting at the second marker 510 and ending at the first marker 506. Further, the third portion 507 may represent a segment of the video starting at the first marker 506 and ending at the finishing time 514.

FIG. 5B illustrates the relationship between the portion of a video A and the reversed portion of the same video A' using the disclosed systems and techniques. In particular, diagram 501 illustrates a timeline 520 of the portion of the video A having a gradient representation, where the densely shaded area of left-most section represents earlier sections of the video A and unshaded area of the right-most section represents later sections of video A. Upon completion of the video reversal using the disclosed systems and techniques, the portion of the video A may be transformed into a reversed portion of the video, designated video A' shown in timeline 522. Accordingly, arrows 521 represent the mapping of the earlier and later sections of video A to earlier and later sections of video A'. Accordingly, the densely shaded area of right-most section represents later sections of the video A' and the unshaded area of the left-most section represents earlier sections of video A', which is the reverse of the same representation for timeline 520.

In upcoming figures described below, the disclosure describes how the user computing entity 110 can take advantage of the reversed video of the remixable portion of the video, together with the user generated timing segments, to generate a set of forward rendering timeline instructions. While the disclosed systems support remixing the video timeline, the user computing entity 110 also support scaling of the timeline (for example, speed-up and/or slow-motion effects). Therefore, the generated set of stitching instructions for performing a forward rendering interpolation between the original video and a reversed portion of that same video may apply the two effects concurrently.

FIG. 6 illustrates a more detailed representation 600 of video reversal and stitching, in accordance with example embodiments of the disclosure. In particular, timeline 601 illustrates a timeline of the portion of the video A having a gradient representation, where the densely shaded area of left-most section represents earlier sections of the video A and unshaded area of the right-most section represents later sections of video A. Upon completion of the video reversal using the disclosed systems and techniques, the portion of the video A may be transformed into a reversed portion of the video, designated video A' in timeline 603.

Moreover, timeline 601 may include a start time (e.g., at the zero-second mark). The timeline 601 may include a finishing time, in this example being at the ten-second mark. Further a first marker 621 and a second marker 623 may be generated as a result of a user's scrubbing input. For example, the user may move their finger back and forth on a visual representation of the portion of the video A, stopping the movement at locations corresponding to the two markers 621 and 623. In this example, the scrubbing may effectively separate the timeline 601 into a first portion 602, a second portion 604, and a third portion 606. Similarly, the reversed video A' in timeline 603 may include a corresponding first portion 608, a second portion 610, and a third portion 612 that are reversed with respect to corresponding video A segments in timeline 601.

In the example depicted in diagram 600, the user may process the 10 second video in 3 steps as shown in composite video representation 607. The composite video representation 607 represents the final scaled and stitched visualization of the video after editing.

In particular, in a first step, the disclosed systems may configure, based on user input, the 0 to 7th second of video A to be in slow-motion with respect to the original video A frame rate.

In a second step, the disclosed systems may configure, based on user input, the 7th second of the video to the 4rth second of reversed video A' to be in slow-motion with respect to the original video A frame rate. In a third step, the disclosed systems may configure, based on user input, that the 4th second of the video to the 10th second of the video to be compressed (e.g., sped up) over 3 seconds.

As noted, in the first step, the user requests to render the first 7 seconds of the video A over 10 seconds. To achieve this, the disclosed systems may need to slow the video down. Accordingly, the disclosed systems may generate a computer-executable instruction as follows: [append 0 to 7th second of A to 0 to 10th second of the output timeline].

As noted, at the second step, the user requests to render the 7th second to the 4th second (e.g., a total of 3 seconds) of the reversed video A' over 5 seconds. To achieve this in a forward-rendering fashion, the disclosed systems may appropriate the corresponding segment from the reversed copy, A'. Moreover, timelines 601 and 603 show the relationship between the video portion and its reversed copy diagram. Further, the timelines show that the ending of video A corresponds to the starting of video A' and vice versa. Accordingly, the frame at the 7th second of the ten-second-long video A refers to the same frame at the 10th-7th=3rd second of video A'. Further, the frame corresponding to the 4th second of video A refers to the same frame at the 10th-4th=6th second of video A'. Accordingly, the disclosed systems may generate a computer-executable instruction as follows: [append 3rd to 6th second of A' to 10th to 15th second of the output timeline].

At the second step, the user requests to render the 4th to the 10th second (a total of 6 seconds) of video A over 3 seconds. In order to achieve this, the disclosed systems may need to speed the portion of the video up. Accordingly, the disclosed systems may generate a computer-executable instruction as follows: [append 4th to 10th second of A to 15th to 18th second of the output timeline].

To summarize, in the above example, the disclosed systems constructed the output timeline with the following computer-executable instructions: [append 0 to 7th second of A to 0 to 10th second of the output timeline], [append 3rd to 6th second of A' to 10th to 15th second of the output timeline], [append 4th to 10th second of A to 15th to 18th second of the output timeline].

FIG. 7A shows a diagram 700 of an exemplary screenshot of an application executed on a mobile device, in accordance with example embodiments of the disclosure. In particular, diagram 700 includes a camera option 701, a featured option 702, and a following option 704. The camera option 701 allows the user to use a camera of a user device (e.g., a mobile phone) to take a video. The featured option 702 allows the user to select from a set of predetermined videos. The following option 704 allows the user to select a video from a set of videos uploaded by social media contacts and/or other user contacts.

Diagram 700 also shows representative frames of a video 706 that provide a visual confirmation that the correct video was selected by the user. Diagram 700 further includes an add button 708, which confirms the user selection of the video and begins the next stage in the processing of the video (e.g., mixing and editing), to be described further below.

FIG. 7B shows a diagram 701 of another exemplary screenshot of the application, in accordance with example embodiments of the disclosure. In particular, diagram 701 may be presented to the user after the user makes a selection of or uploads a video as shown and described in connection with FIG. 7A, above. Further FIG. 7 includes a scrubby feature 710, a library option 712, and a shoot option 714. If the user selects the scrubby feature 710, the disclosed systems may present an interface for the user to provide scrubbing inputs. That is, the user may be provided with a timeline representing the video, and the user may interact with the display of the user device to indicate the scrubbing portions of the video. For example, the user may make movements with the user's finger in opposing directions on the screen of the mobile device corresponding to the user's scrubbing input. Alternatively or additionally, the user may manipulate a playhead or cursor associated with a video player while presenting a preview of the reversed portion of the video. The disclosed systems may generate, in a background process, of a reversed video in accordance with the scrubbing input provided by the user. Further, the library option 712 may again provide the user with the opportunity to select a video from a set of predetermined videos. The shoot option 714 may again allow the user to use a camera of the user device to take the video.

FIG. 8A shows a diagram 800 of another exemplary screenshot of the application, in accordance with example embodiments of the disclosure. In particular, diagram 800 includes a pick music option 802 and a pick video option 804. The pick music option 802 allows the user to select an audio clip from a database (e.g., an Internet-based database) of audio files. Further, the pick video option 804 allows the user to upload a different video in case the video selected by the user in a previous selection is no longer preferred (e.g., the user changes his or her mind).

FIG. 8B shows a diagram 801 of another exemplary screenshot of the application, in accordance with example embodiments of the disclosure. In particular, diagram 801 includes a "My Music" option 806 and a "Find Music" option 807. The "My Music" option 806 allows the user to upload a media file from the user's device or associated online accounts (e.g., social media account). The "Find Music" option 807 includes a search box 808 that allows the user to search for music. Diagram 801 also shows representative music titles 810 that the user may select.

FIG. 9A shows a diagram 900 of another exemplary screenshot of the application, in accordance with example embodiments of the disclosure. In particular, diagram 900 includes a pick music option 902 and a pick video option 904, which allow the user to upload a different video or a different audio option in case the previous selection is no longer preferred.

FIG. 9B shows a diagram 901 of another exemplary screenshot of the application, in accordance with example embodiments of the disclosure. In particular, diagram 901 shows an add video option 912, a scrubbing input option 914, a speed control option 916, and a video editing option 918. The add video option 912 allows the user to replace the existing video with a different video. The scrubbing input option 914 represents an example interface with which the user may interact with the disclosed systems to provide scrubbing inputs. In particular, the user may use his or her finger to drag a cursor of the scrubbing input option 914 to the left into the right to indicate the scrubbing inputs. The user computing entity 110 may then translate the scrubbing inputs to computer executable instructions for reversing the video during playback. In some examples, the user computing entity 110 may provide the speed control option 916 to allow the user to select a playback speed. While in this particular exemplary screenshot the playback speed is relegated to a slow, normal, and fast division, in other examples (not shown), the user computing entity 110 may provide a text box or any other suitable interface for the user to select or provide a speed for video playback. As noted, the user computing entity 110 may use the information obtained from the speed control option 916 to generate a scaling factor. In turn, the user computing entity 110 may use the scaling factor to scale the reversed video portion to yield a scaled reversed video portion.

FIG. 9C shows a diagram 903 of another exemplary screenshot of the application, in accordance with example embodiments of the disclosure. In particular, diagram 903 includes a processing indicator 926 and a scrubby option 928. In particular, the processing indicator 926 represents an indicator that shows the relative time to completing a rendering of the final media file, that is, the stitched video including the scaled reversed video portion. Further, the scrubby option 928 may present the user with the option to interrupt the rendition of the final media file and instead revisit the editing phase and provide different scrubbing inputs for the video.

FIG. 10 is an illustration of an exemplary method 1000 that describes representative operations for video editing, in accordance with example embodiments of the disclosure. At block 1002, the method includes receiving a file at a user device, the file including a video and presenting a representation of the video at the user device. In particular, the representation of the video may include an image of one or more frames of the video that may serve to identify the content of the video easily. As noted, the user may upload the video from an existing database on the user device or via an external database on an external device. The external database may include Internet-based database.

In some examples, the file may further include existing audio. In particular, existing audio may include background noises and/or speech associated with the file. Further, such existing audio may distract from a generated media file including a music video. Accordingly, the file may be processed to filter the existing audio. In particular, any suitable computer-implemented or device-implemented technique may be used to filter the existing audio from the file. In some examples, the user may be provided with a rendition of the filtered audio prior to the user providing scrubbing inputs.

At block 1004, the method may include receiving a user selection indicative of a scrubbable portion of the video at a first time, and generating a reversed video portion at the first time based on the scrubbable portion. As noted, the user may provide inputs to indicate the portion of the file that the user wishes to scrub. Moreover, the user computing entity 110 may begin generating the reverse video portion at the first time in a background thread to enable multitasking and thereby allow the user to continue interacting with the user device. In some examples, the method may include receiving an audio file (e.g., a music file) at the user device, and generating a reversed audio portion of the audio file at the first time. Further, the audio file may be selected from a database of audio files.

At block 1006, the method may include receiving a scrubbing input and a playback speed at the user device, the scrubbing input indicative of playback of the scrubbable portion of the video in a forward direction and in a reverse direction. As noted, the user computing entity 110 may provide a suitable interface of an application running on the user's device to obtain the scrubbing input. Similarly, the user computing entity 110 may provide a suitable interface to obtain the playback speed for the scrubbing portion of the video. In some examples, the user computing entity 110 may present a preview of the media file at the user device based on the scrubbing input. This may allow the user to get a real-time viewing of the reverse video portion, thereby allowing the user to make modifications to their scrubbing input without having to wait for the final rendered video, thereby increasing the efficiency of interaction.

At block 1008, the method may include generating a scaling factor between the scrubbing input and the playback speed, and scale the reversed video portion based on the scaling factor to yield a scaled reversed video portion. As noted, the scaling factor may include a numerical representation of the relative playback speed in comparison with the original playback speed of the video. In some examples, the user computing entity 110 may scale the reversed audio portion based on the scaling factor to yield a scaled reversed audio portion. In particular, the user computing entity 110 may scale the reversed audio portion to match the scaled reversed video portion. This way, the user computing entity 110 ensures that the rendered output media file does not have video and audio portions that are out of synchronization with one another.

At block 1010, the method may include generating additional instructions to combine the video and the scaled reversed video portion. In particular, the instructions may be executed by a processor in communication with memory to perform the combination. In some examples, the user computing entity 110 may receive additional instructions to combine a first portion of the video that occurs before the scrubbable portion, the scaled reversed video portion, and a second portion of the video including the scrubbable portion and a remainder of the video. Further, the additional instructions may serve to compress (or expand) the second portion (e.g., in accordance with the scale factor provided by the user). In some examples, the generation of the additional instructions may further include generating instructions for combining the video, the scaled reversed audio portion, and the scaled reversed video portion. In the embodiment described in FIG. 10, the user computing entity 110 is described as performing the process steps. However, other embodiments of the present invention include the management computing entity 100 performing one, or more, or all, of the process steps described herein, as appropriate.

As noted, AI may be used to variously improve upon the selection of videos and/or portions of the video by the user, for example, by suggesting videos to the user based on a user's profile, user data, or other data. Embodiments of devices described herein can employ AI to additionally facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform functions, actions, and/or determinations.

A classifier can map an input attribute vector, $z=(z1, z2, z3, z4, \ldots, zn)$, to a confidence that the input belongs to a class, as by $f(z)=\text{confidence}(\text{class})$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

IV. Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks, which include Compact Disk Read-Only Memory (CD ROMS), Digital Versatile Disks (DVDs), etc., as well as digital and analog communication media.

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every user in a client-server environment is accommodated to practice the methods of the present invention.

V. CONCLUSIONS

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention as defined by the appended claims.

What is claimed is:

1. A system for producing a media file, comprising:
a non-transitory, computer-readable storage medium storing program code; and
a processor that executes the program code to perform operations to:
present a representation of a video at a user device;

receive a user selection of a selected portion of the video at a first time;
generate a reversed video portion based on the selected portion; and
combine at least a first portion of the video and a second portion of the reversed video portion to produce the media file.

2. The system of claim 1, wherein the operations further comprise to:
receive a user input at the user device, the user input indicative of playback of the selected portion of the video in a forward direction and in a reverse direction;
update the reversed video portion based on the user input to yield an updated reversed video portion; and
combine the selected portion and the updated reversed video portion to produce the media file.

3. The system of claim 2, wherein updating the reversed video portion comprises scaling the reversed video portion based on a scaling factor based on the user input.

4. The system of claim 1, wherein the operations further comprise to:
execute one or more instructions to combine the video and the reversed video portion to produce the media file.

5. The system of claim 4, wherein the instructions comprise additional instructions to combine a third portion of the video that occurs before the selected portion, the reversed video portion, and a fourth portion of the video including the selected portion and a remainder of the video.

6. The system of claim 5, wherein the instructions comprise additional instructions to compress the fourth portion.

7. The system of claim 1, wherein the operations further comprise to:
present a preview of the media file at the user device.

8. The system of claim 1, wherein the video further comprises existing audio, and wherein the operations further comprise to process the video to filter the existing audio.

9. The system of claim 1, wherein the operations further comprise to:
receive an audio file at the user device, wherein the audio file is selected from a database of audio files; and
generate a reversed audio portion of the audio file at the first time.

10. The system of claim 9, wherein the operations further comprise to:
combine the video, the reversed audio portion, and the reversed video portion.

11. The system of claim 1, wherein generating the reversed video portion at the first time based on the selected portion is performed in a background process while the user is performing editing operations on the user device.

12. A non-transitory computer-readable medium storing computer-executable program code for producing a media file which, when executed by a processor, cause the processor to perform operations to:
present a representation of a video at a user device;
receive a user selection of a selected portion of the video at a first time;
generate a reversed video portion based on the selected portion; and
combine at least a first portion of the video and a second portion of the reversed video portion to produce the media file.

13. The non-transitory computer-readable medium of claim 12, wherein the operations further comprise to:
receive a user input at the user device, the user input indicative of playback of the selected portion of the video in a forward direction and in a reverse direction;
update the reversed video portion based on the user input to yield an updated reversed video portion; and
generate instructions to combine the selected portion and the updated reversed video portion to produce the media file.

14. The non-transitory computer-readable medium of claim 13, wherein the instructions comprise additional instructions to combine a third portion of the video that occurs before the selected portion, the reversed video portion, and a fourth portion of the video including the selected portion and a remainder of the video.

15. The non-transitory computer-readable medium of claim 14, wherein the instructions comprise additional instructions to compress the fourth portion.

16. The non-transitory computer-readable medium of claim 12, wherein the operations further comprise to present a preview of the media file at the user device.

17. The non-transitory computer-readable medium of claim 12, wherein the video further comprises existing audio, and wherein the operations further comprise to process the video to filter the existing audio.

18. A computer-implemented method for producing a media file, comprising:
presenting a representation of a video at a user device;
receiving a user selection of a selected portion of the video at a first time;
generating a reversed video portion based on the selected portion; and
generating the media file by combining at least a first portion of the video and a second portion of the reversed video portion.

19. The computer-implemented method of claim 18, wherein generating the media file comprises combining a second portion of the video that occurs before the selected portion, the reversed video portion, and a third portion of the video including the selected portion and a remainder of the video.

20. The computer-implemented method of claim 18, further comprising:
receiving an audio file at the user device;
generating a reversed audio portion of the audio file at the first time; and
generating the media file by combining the video, the reversed audio portion, and the reversed video portion.

* * * * *